United States Patent [19]

Hisao et al.

[11] 4,163,260
[45] Jul. 31, 1979

[54] SYSTEM FOR REDUCING BAND WIDTH OF IMAGE SIGNAL

[75] Inventors: Nobuyoshi Hisao, Neyagawa; Takeshi Agui, Yokohama, both of Japan

[73] Assignee: Mita Industrial Company, Osaka, Japan

[21] Appl. No.: 867,868

[22] Filed: Jan. 9, 1978

Related U.S. Application Data

[63] Continuation-in-part of Ser. No. 760,312, Jan. 18, 1977, abandoned.

[30] Foreign Application Priority Data

Jan. 24, 1976 [JP] Japan .................................. 51/6876

[51] Int. Cl.² ............................................... H04N 1/00
[52] U.S. Cl. ............................. 358/261; 340/347 DD

[58] Field of Search ........................... 358/260, 261; 340/347 DD; 364/515

[56] References Cited

U.S. PATENT DOCUMENTS

| | | | |
|---|---|---|---|
| 3,804,975 | 4/1974 | Abe | 358/260 |
| 3,992,572 | 11/1976 | Nakagome | 358/260 |
| 4,028,731 | 6/1977 | Arps | 358/260 |

*Primary Examiner*—Howard W. Britton

[57] ABSTRACT

A system for reducing or compressing band width of an image signal by logically combining each picture element on at least two scanning lines to form 0 and 1 sections, and coding the 0 and 1 sections for transmission. The coding step comprises run length-coding one of the 0 and 1 sections, and converting the other section into a series of raw signals with an end signal positioned at the end of the raw signals train for indicating the termination thereof.

6 Claims, 7 Drawing Figures

First Scanning Line / Second Scanning Line (a)

First Scanning Line: 0 0 0 1 1 0 0 0 1 1 0 0 0
Second Scanning Line: 0 0 0 0 1 1 0 0 0 1 0 0 0 (b)

OR Signal (NOR Signal): 0 0 0 1 1 1 0 0 1 1 0 0 0 (c)

RL(3) / Raw Signal / RL(2) Signal / RL(3)
0 1 1  1 0  1 1  0 1  0 0  0 1 0  1 0  1 1  0 0  0 1 1 (d)
AB CD EF   GH IJ

FIG.2

| RL | Code | Word Length |
|---|---|---|
| 1 | 001 | 3 |
| 2 | 010 | 3 |
| 3 | 011 | 3 |
| 4 | 100 00 | 6 |
| 5 | 100 01 | 6 |
| 6 | 100 10 | 6 |
| ⋮ | ⋮ | ⋮ |
| 15 | 101 11 | 6 |
| 16 | 110 010000 | 9 |
| ⋮ | ⋮ | ⋮ |
| 63 | 110 111111 | 9 |

SYSTEM FOR REDUCING BAND WIDTH OF IMAGE SIGNAL

This is a continuation-in-part application of Ser. No. 760,312 filed Jan. 18, 1977 now abandoned.

BACKGROUND OF THE INVENTION

1. Field of the Invention

The present invention relates to a band reduction or compression system, and more particularly to a coding system for the transmission and reception of an image signal obtained by scanning a two-dimensional image for facsimile transmission and the like.

2. Description of the Prior Art

There has been proposed a system for collectively coding a plurality of images by utilizing two-dimensional correlation in both the horizontal and the vertical directions of scanning, since a high compression rate to band reduction cannot be used with one-dimensional correlation of an image. As an example thereof, there is employed a system for performing band compression by detecting a black and white mode between a predetermined number of adjacent picture elements, giving a code to each mode, measuring run length of each mode, and coding the run length.

When employing such system, however, a plurality of scanning lines are collectively coded, so that if a signal error is generated in a transmission line, an image reproduced in said scanning line after generation of the error becomes an ugly image of inferior reproducibility apart from the original image, that is, the reproduced image by the scanning line where an error is generated makes all the picture elements in the scanning line white or becomes the same reproduced image as that immediately before the scanning line. When a plurality of scanning lines are reproduced, a considerably deteriorated image is obtained, and further since a plurality of scanning lines are collectively transmitted, there is required such steps that a mode of the corresponding position is detected, transition to the next mode is detected, a transition code is given thereto, and a run length of the mode is coded. Then, each mode often has a run length of 1, so that if a transition code is given to each mode and a code expressing the run length is given, redundancy is inevitably increased, and as a result, the apparatus becomes very complicated and expensive.

SUMMARY OF THE INVENTION

An object of the present invention is to eliminate the above described defects of the conventional system.

Another object of the invention is to provide a system for reducing band width of an image signal, in which the transmission time is shortened by making the band compression rate as large as possible.

According to the invention a mode of white only is run length-coded for making the compression rate high, while another mode of black and white, or black only is coded for transmitting it as a raw signal.

The way of reducing band width of image signal comprises one step of logically combining each picture element on at least two scanning lines to form 0 and 1 sections, and a second step of coding the 0 and 1 sections for transmission. The first coding step comprises run length-coding one of the sections, and converting the other section into a series of raw signals continued in any selected order at the same position as in original signals and into an end signal of the raw signal train for indicating the terminaton of such raw signal train.

BRIEF DESCRIPTION OF THE DRAWINGS

FIG. 1 (a), (b), (c) and (d) are truth tables illustrative of the operation of a coding system for the transmission and reception of an image signal according to the present invention;

FIG. 5 is a more detailed block diagram of the transmission system shown in FIG. 3;

DESCRIPTION OF THE PREFERRED EMBODIMENT

Figure 1:
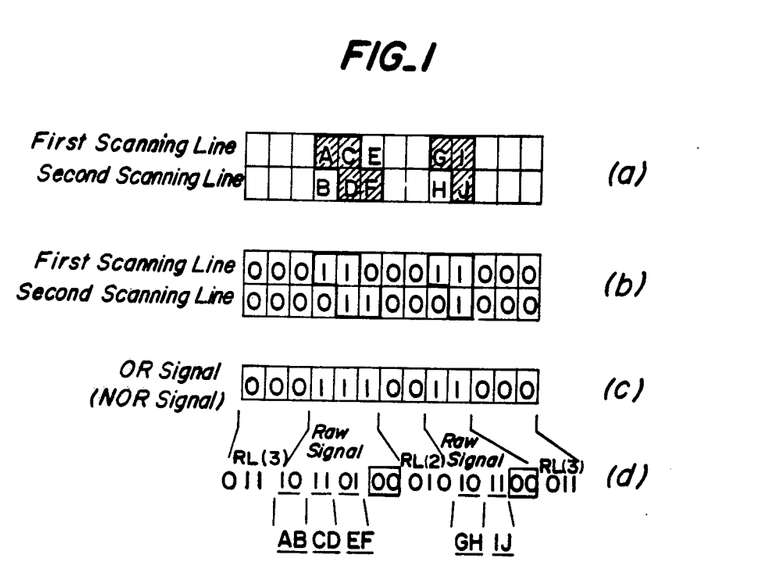

Referring now to FIG. 1 a system for reducing band width of an image signal according to the invention is shown. In this embodiment supposing that two scanning lines are transmitted and, as shown in FIG. 1(a) picture elements A, C, G, and I in a first scanning line, and picture elements D, F, and J in a second scanning line are made black, respectively; and other picture elements are white. When such picture elements are transmitted, as shown in FIG. 1(b), each picture element on each scanning line is converted into a signal of 0 or 1 according to a black and white mode, and each picture element at the same position on the first and second scanning lines is logically operated to form 0 section, or 1 section, as shown in FIG. 1(c) thereby to take out an OR signal. That is, the OR signal of a white and white mode becomes 0, and the OR signals of the other modes become 1.

The section of the OR signal 0 is run length-coded, and in this case, there is coded for a variable code length having excellent efficiency. Therefore, for the purpose of observing what bit the code length used for expressing the run length, there is used, for example a code shown in FIG. 2. This means that if the first is 0, the code length for expressing the run length is next two bits, and if the first is 10, the code length is next 4 bits in the same manner. Thus the section is determined and the run length is merely binary-coded in numerical number.

As to the section of the OR signal 1, the length of continuing the section of this 1 is not certain, so that even if a raw signal is transmitted, its end cannot be know. Therefore, in case of FIG. 1(a), the section of the raw signal is transmitted as AB CD EF 00. This means that the OR signal is 1, so that either one, such as B or A, C or D . . . , contains black, i.e., a signal 1, so that when signals transmitted by dividing every 2 bits are observed, there is no signal continued 00 or 0 twice. Thus, in order to show the end of the raw signal section, an end signal of 00 is added to the end as shown in FIG. 1(d).

On the other hand, the reception circuit detects every 2 bits of the raw signal section and understands that the raw signal section is finished when an end signal of "00"

is received, and further understands that the following signals are run length codes of white and white mode. A run length code and a raw signal are alternately transmitted, so that the reception circuit can correctly reproduce the original image.

Figure 3:
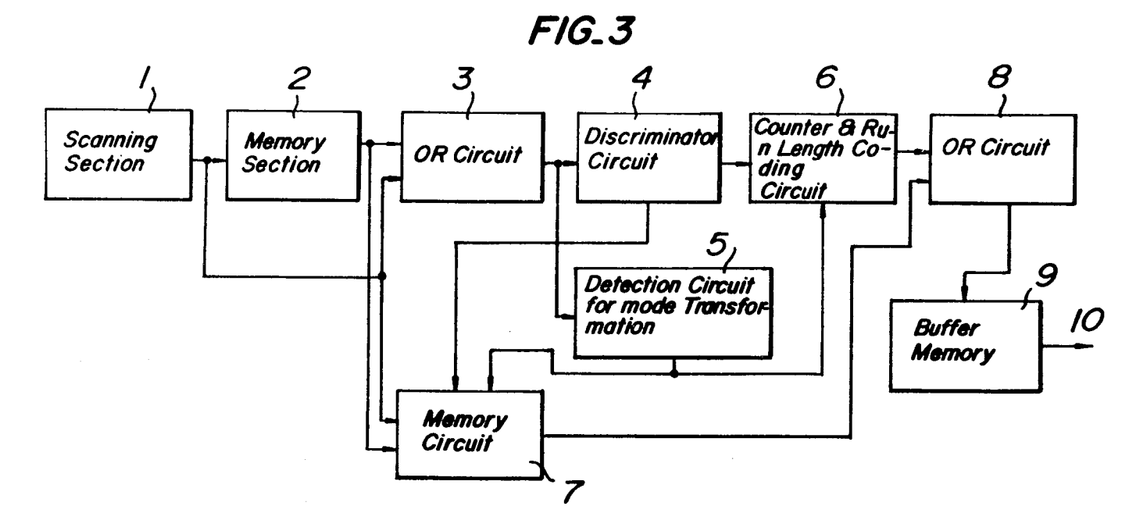
FIG. 3 is a block diagram showing one embodiment of a transmission system for transmitting signals obtained by the coding system according to the present invention.

FIG. 3 is a simplified block diagram showing one embodiment of a system for transmitting signals of the coding system according to the present invention. A scanning section 1 is provided for obtaining the information shown in FIGS. 1(a) and 1(b) by scanning the given information and by sampling and quantamizing it. A memory circuit provides for storing informations of the first scanning line shown in FIGS. 1(a) and 1(b) with the use of a shift register for reading out one of the information of the first scanning line when every one information of the scanning line is read in. An OR circuit 3 obtains the OR signal shown in FIG. 1(c) by successively OR operating a picture element at the present scanning position and a picture element of the first scanning line at the same position. A discriminator circuit 4 selects the output determined by whether the output of the OR circuit 3 is in the section of the OR signal 0, or the section 1.

A mode transition detecting circuit 5 compares the code of the OR signal when the OR signal discriminates whether the 0 section or the 1 section with the code of OR signal of the prior section and by detecting whether the coincidence signal or the mode transition is generated. A counter and run length coding circuit 6 counts the number of pulses when one pulse is transmitted in case of the section of the OR signal 0 or the circuit 3 and for run length-coding. Memory circuit 7 is provided for storing an information of the picture element at the present scanning position in the section 1 of the OR signal of the circuit 3, and an information of the picture element at the same position as that of the first scanning line in the predetermined order.

Figure 2:
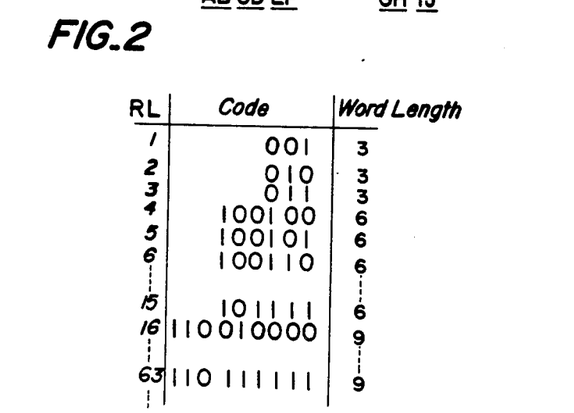
FIG. 2 is a table showing a run length coding.

If the output of the mode transition detecting circuit 5 does not detect any mode transition, each circuit 6 or 7 performs the above described action, but when the mode transition is detected, for example when the mode transition is generated from the section 1 of the OR signal to the section 0, the counter circuit 6 codes the counted run length by the run length code shown in FIG. 2, and transmits it to the OR circuit 8. Thereafter, the counter circuit 6 is reset for new measurement. On the other hand, the memory circuit 7 stores two picture element informations of the first and second scanning lines. When the mode transition is generated from the section 0 of the OR signal to the section 1, the memory circuit 7 transmits the stored information in the section 1 of the OR signal to the OR circuit 8 and further transmits an end signal when the stored informations are transmitted.

Then, the memory circuit 7 is cleared for a new storage. On the other hand, the counter circuit 6 receives one pulse corresponding to the section 1 of the OR signal 0 and counts 1. The OR circuit 8 transmits the information transmitted from the counter circuit 6, or the memory circuit 7, of a buffer memory circuit 9. In the buffer memory circuit 9, a signal once transmitted from the OR circuit 8 is stored for transmitting the information to a transmission line 10 at a certain transmission speed.

Figure 4:
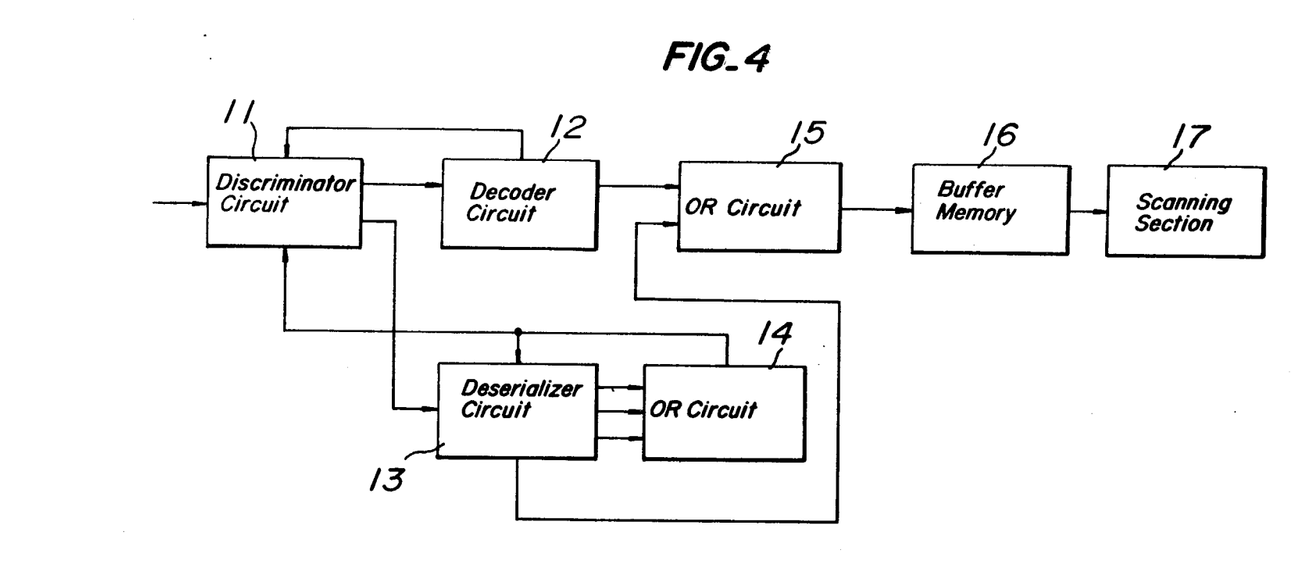
FIG. 4 is a block diagram showing one embodiment of a reception system for carrying out the coding system according to the present invention.

FIG. 4 is a block diagram showing one embodiment of a reception system in which a discriminator circuit 11 is provided for discriminating whether the received signal is supplied to a decoding circuit 12, or to a deserializer circuit 13. If the received signal is in the section 0 of the OR signal, such signal is transmitted to the decoding circuit 12. If the signal is in the section 1 of the OR signal, it is transmitted to the deserializer circuit 13. The decoding circuit 12 decodes the signal of the section 0 to the original run length. When the signal in the section 0 of the OR signal is ended, the signal is supplied to the discriminator circuit 11, and the following signals are supplied to the deserializer circuit 13 as a signal in section 1 of the OR signal. The decoded signal is also transmitted to the OR circuit 15. The deserializer circuit 13 receives the signal by the number of collectively transmitted scanning lines, thereby to make the signal series-parallel conversion after once stored it. An OR circuit 14 discriminates whether the signal is a raw signal, or an end signal according to OR operation of the thus converted signal. If the signal is a raw signal, the raw signal is supplied to the OR circuit 15. Further, if the signal is an end signal, the end signal is transmitted to the discriminater circuit 11 and the following signals are supplied to the decoding circuit 12. The OR circuit 15 operates to transmit the input signal to a buffer memory circuit 16 which stores the signal so transmitted, and a scanning section 17 forms a receiving image by scanning.

Figure 6:
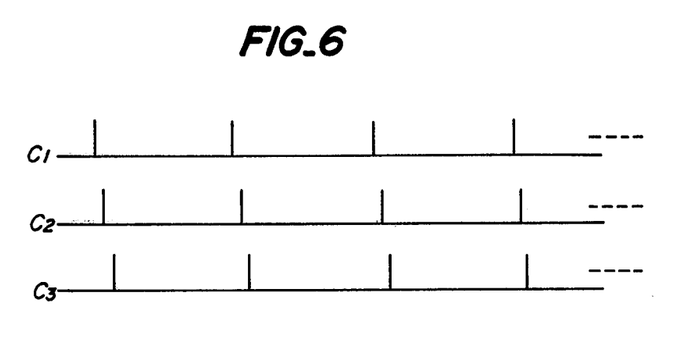
FIG. 6 is a time chart of three clock pulses generated from the control device shown in FIG. 5.

FIG. 5 is an explanatory circuit of the block diagram of the transmission system shown in FIG. 3 in greater detail. FIG. 6 is a time chart of three clock pulses generated from control device 100 shown in FIG. 5. The control device 100 generates a clock pulse $C_1$, a clock pulse $C_2$ and a clock pulse $C_3$ in order and in succession. The clock pulses $C_3$ and $C_1$ are spaced apart from each other by the time necessary for transmitting a signal from the counter and run length coding circuit 6, or the memory circuit 7 to the buffer memory circuit 9 through the OR circuit 8 when the OR signal shown in FIG. 1(c) is subjected to the mode transition. The informations of two image elements at the same position on two scanning lines are successively supplied to the OR circuit 3 by synchronizing with the clock pulse $C_1$.

The output of the OR circuit 3 is supplied to the discriminator circuit 4 consisting of one inverter and two AND gates. In this circuit 4 the output is inverted at an inverter $I_1$ when the output of the OR circuit 3 is 0, so that the AND gage $A_1$ is opened and the AND gate $A_2$ is closed. When the output of the OR circuit 3 is 1, the AND gate $A_1$ is closed and the AND gate $A_2$ is opened. Thus, this circuit 4 serves as a discriminator circuit for opening one of two AND gates and closing the other thereof in accordance with the state of the output of the OR circuit 3. The clock pulse $C_3$ applied to these two AND gates, therefore, supplies one pulse $C_4$ to the counter and run length coding circuit 6 through the AND gate $A_1$ when the output of the OR circuit is 0 and one pulse $C_5$ to the memory circuit 7 through the AND gate $A_2$ when the output of the OR circuit 3 is 1.

The mode transition detecting circuit 5 stores the output from the OR circuit 3 in its two flip-flops $FF_1$ and $FF_2$ by the clock pulse $C_2$ successively. These two flip-flops are formed as a D-flip-flop, the output of the OR circuit 3 is input in the flip-flop $FF_1$ and the output of the flip-flop $FF_2$ is input in the flip-flop $FF_2$. In this case these flip-flops operate by the clock pulse $C_2$. Accordingly, the present mode is stored in the flip-flop $FF_1$ and the mode one prior to the present mode is stored in the flip-flop $FF_2$. When the outpus of these two flip-flops are used as the inputs of an exclusive OR gate $O_2$, if there mode transition, its output is 1, and if the same mode is continued, its output is 0, where can be discriminated whether or not the mode transition occurs.

If the output of the OR circuit 3 is mode changed from 0 to 1, the output of the flip-flop $FF_1$ becomes 1, so that the output of the exclusive OR gate $O_2$ and the clock pulse $C_3$ are supplied to the AND gate $A_3$, whereby it becomes possible to supply a pulse $C_6$ for informing termination of the section 0 of the OR signal to the counter and run length coding circuit 6. If the output of the OR circuit 3 is mode changed from 1 to 0, the output of the flip-flop $FF_2$ becomes 1, and this output, the output of the exclusive OR gate $O_2$ and the clock pulse $C_3$ are supplied to the AND gate $A_4$, whereby it becomes possible to supply a pulse $C_7$ for informing the section 1 of termination of the OR signal to the memory circuit 7.

The counter and run length coding circuit 6 receives a number of pulses $C_4$ corresponding to the amount of run lengths in the section 0 of the OR signal and converts them to the run length code shown in FIG. 2. The pulses $C_4$ are firstly input into a binary counter 61 and converted into a binary number. This binary counter 61 is sectioned by every two bit block from the last position for counting a number of pulses, supplying a carry signal to a coding length decision circuit 62 when the counter of two bits at the lowest position is filled, and continuing the counting inclusive of the counter of two bits at the upper position. When the counter of further upper bits is filled, a carry signal is supplied to the coding length decision circuit 62 and the counting is continued with the use of the counter of the further upper two bits. Such counting is continued until the maximum run length is counted. The coding length decision circuit 62 can detect what bit the coding length is at present.

When the output of the OR circuit 3 is changed from 0 to 1, the pulse $C_6$ showing termination of the section 0 is supplied from the mode transition detecting circuit 5 to the coding length decision circuit 62. Then to a flag bit sending circuit 63 is sent such indication that flag bits for indicating the coding length used up are supplied from this circuit to the OR circuit 8 through the OR gate $O_1$. When the flag bits are completely sent, the content of the counter by a number of blocks used for the successive content of the binary counter 61 is sent to the OR gate $O_1$ by the indication of the coding length decision circuit. The flag bit and the content of the binary counter are synchronized with the clock pulse $C_8$ generated from the coding length desicion circuit and sent to the buffer memory circuit 9 through the OR circuit 8. When all the signals are completely sent, the binary counter is reset for the next counting.

The memory circuit 7 is for memorizing information of raw signals of two image elements at the position where the output of the OR circuit 3 is 1. A series-parallel converter circuit 73 consisting of, for instance, a parallel inserial out shift register reads in two image element signals at the present position by the clock pulse $C_2$. Then, a pulse generator 71 having received the clock pulse $C_5$ sent from the discriminator circuit 4, generates two pulses, and these two pulses send a signal stored in the series-parallel converter circuit 73 to a memory 74 by parallel-series conversion. An address counter and clock generator 72 receives two pulses generated from the pulse generator 71, sets an address of the memory 74 formed by for instance a random access memory, memorizes signals sent by every two image elements from the series-parallel converter circuit 73 and counts a number of signals.

When receiving the pulse $C_7$ sent from the mode transition detecting circuit 5, if the output of the OR circuit 3 is changed from 1 to 30, this circuit sends the signals stored up to the OR gate $O_3$. When these signals are completely sent, the indication is generated to send 00 of the end signal of an end signal generator 75 to the OR gate $O_3$. These signals are passed through the OR gate $O_3$ and sent to the memory circuit 9 through the OR circuit 8 by synchronizing with the clock $C_9$ generated from the address counter and clock generator 72.

Figure 7:
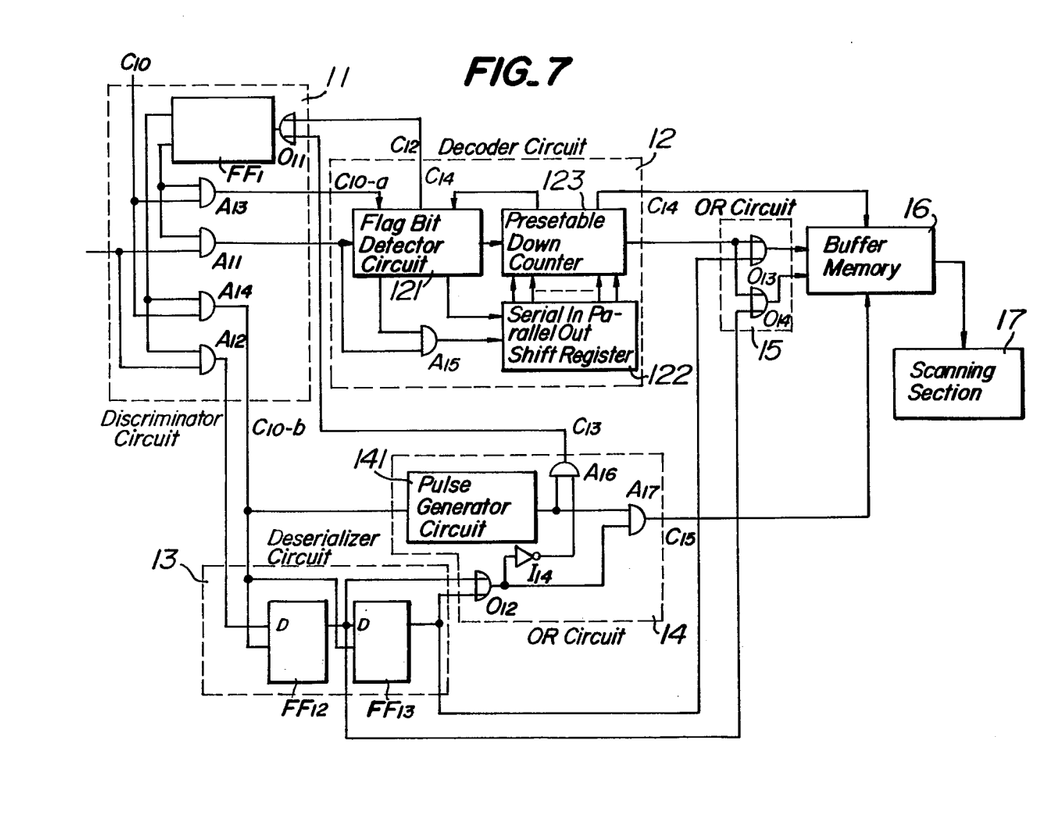
FIG. 7 is a more detailed block diagram of the reception system shown in FIG. 4.

FIG. 7 is an explanatory circuit of the reception system shown in FIG. 4 in detail. The discriminator circuit 11, FIG. 7, comprises four AND gates, one flip-flop and one OR gate. A clock pulse $C_{10}$ is synchronized with a transmission speed of the signal sent from the transmission system. The flip-flop $FF_{11}$ alternately receives a pulse $C_{12}$ sent when the reception of the signal of the section 0 of the OR signal from the decoder circuit 12 is completed and a pulse $C_{13}$ sent when the reception of the signal of the section 1 of the OR signal from the OR circuit 14 is completed through the OR gate $O_{11}$, inverses the state of the output every time and opens and closes AND gates $A_{11}$–$A_{14}$ so as to alternately send the clock pulse $C_{10}$ and the received signal to the decoder circuit 12 and the deserializer circuit 13.

In case of receiving the signal of the section 0 of the OR signal, the AND gates $A_{11}$ and $A_{13}$ are opened and the AND gates $A_{12}$ and $A_{14}$ are closed, the received signal and the clock pulse $C_{10-a}$ are sent to the decoder circuit 12. The circuit 11 receives the pulse $C_{12}$ when the reception of the signal of the section 0 of the OR signal is completed, inverses the output of the flip-flop $FF_{11}$, closes the AND gates $A_{11}$ and $A_{13}$, opens the AND gates $A_{12}$ and $A_{14}$, and send the clock pulse $C_{10-b}$ and the following received signal to the deserializer circuit 13.

The decoder circuit 12 is provided for decoding the received signal to the original run length. The run length code sent from the discriminator circuit 11 is firstly input in a flag bit detector circuit 121. This circuit counts a number of 1 until the 0 first appears in the received signal and detects a flag bit for obtaining the coding length. When the 0 first appears, the code length for showing the run length is the next two bits, while when the 0 appears after one of the 1 is counted, the code length is 4 bits, thereby a number of the following bits is determined by a number of 1 counted. When the 0 is detected, the AND gate $A_{15}$ is closed and the signal by the code length detected is sent to a serial in-parallel out shift register 122. When the signal by the code length is passed through the AND gate $A_{15}$, it means the completion of receiving the section 0 of the OR signal, so that the pulse $C_{12}$ is sent to the discriminator circuit 11 and the following signals are directed toward the deserializer circuit 13.

The signals successively sent to the flag bit are successively stored in the serial-in parallel out shift register. The thus stored signal is a simple binary number of the run length, so that the signal is shifted to a presettable down counter 123 as it is. The presettable down counter 123 down-counts the thus shifted binary number to zero by the clock pulse $C_{14}$. A number of the clock pulses $C_{14}$ generated until the counter becomes 0 exhibits the original run length. The information by a number of decoded run lengths is written in the buffer circuit 16 through the OR circuit 15 by the clock pulse $C_{14}$.

The deserializer circuit 13 comprises two D flip-flops $FF_{12}$ and $FF_{13}$. To the flip-flop $FF_{12}$ is input a signal from the discriminator circuit 11 and to the flip-flop $FF_{13}$ to input the output of the $FF_{12}$, respectively. These flip-flops operate by the clock pulse $C_{10-b}$. Therefore, the first received signal is stored in the $FF_{12}$ by the first pulse and the first received signal is stored in the $FF_{13}$ by the second pulse and the second received signal is stored in the $FF_{12}$. The outputs of these two flip-flops are supplied to OR circuits 14 and 15. The OR circuit 14 is for dividing a signal of one section of the OR signal into to bits and discriminating whether or not the signal is an end signal.

A pulse generator circuit 141 generates one pulse every time two clock pulses $C_{10-b}$ are received. At first, the information for two bits is stored in two flip-flops of the deserializer circuit 13 by two clock pulses $C_{10-b}$. The logic sum of this information performed by the OR gate $O_{12}$. Then according to the state of the output of this OR gate $O_{12}$, since the output is inverted and supplied to the AND gate $A_{16}$ by the inverter $I_{14}$, either one of the AND gate $A_{16}$ or $A_{17}$ is opened and the other is closed.

If the output of the OR gate $O_{12}$ is 0, i.e., both the informations of two bits are 0, say end signals, the AND gate $A_{16}$ is opened and the AND gate $A_{17}$ is closed. When the pulse generator circuit 141 receives two clock pulses $C_{10-b}$ and generates one pulse, this pulse is passed through the AND gate $A_{16}$ and sent to the discriminator circuit 11 as the pulse $C_{13}$ for informing termination of section 1 of the OR signal. If the output of the OR gate $O_{12}$ is 1, no pulse $C_{13}$ is sent so that the information stored in the deserializer circuit is passed through the OR circuit 14 by the pulse $C_{15}$ passed through the AND gate $A_{17}$ as a raw signal and is written in the buffer memory 16. In this manner, the section 1 of the OR signal is divided by every two bits for detecting the end signal.

The OR circuit 15 includes two OR gates $O_{13}$ and $O_{14}$ and sends signals alternately received from the decoder circuit 12 and the deserializer circuit 13 to the buffer memory circuit 16 as an information of the second scanning line.

The signal thus stored in the buffer memory 16 becomes the same as in FIG. 1(b) so that the information which is the same as that sent from the scanning section 17 can be reproduced.

As described above, according to the present invention, there is employed a system that each picture element on more than two scanning lines is logically operated to form 0-section and 1-section, the 0-section is run length coded, and the 1-section is converted into a raw signal continued in the optionally selected order at the same position in the original signal and an end signal having the same number as that of the scanning lines at the end, respectively. Therefore, about 60% of the transmitted codes are raw signals, so that allowance of any transmission error is high (even if a code error is generated during transmission, if the error is a transmission error in a section or raw signals, only one picture element is mistaken from white to black or black to white without any influence upon a reproduced image, so that the invention is very stable against transmission error, and the raw signal is transmitted as it is, so that there is no need to detect the mode and the like, and as a result, the apparatus can be simiplified and made inexpensively. Thus, as a collective transmission system of a plurality of scanning lines, the present invention performs excellent effects by sufficiently attaining the desired object described in the above.

The collective transmission of two picture elements on two scanning lines is explained in the above, but it is a matter of course that the number of scanning lines can be made more than three lines and the present invention can be applied to collective transmission of each picture element of each line. Further, the logic function of each mode is not only an operation of the OR signal but also NOR signal. Alternately conversion to a raw signal shown in FIG. 1d can be 01 11 10 00, and the run length coding of the section of the OR signal 0 is not limited to a code table of two bit group shown in FIG. 2, but any coding system can be employed. Such modification can easily be carried out by those skilled in the art.

What is claimed is:

1. A system for reducing or compressing the bandwidth of image signals comprising circuit means for logically summing bit signals of picture elements in the same position on at least two scanning lines to form an 0-section and a 1-section, and circuit means for coding by a run length code said 0- and 1-sections for transmission.

2. A system as claimed in claim 1, wherein said circuit means for logically summing the bit signals of the picture elements on the scanning lines comprises an OR circuit.

3. A system as claimed in claim 1, wherein said logically summing circuit means comprises a NOR circuit.

4. A system as claimed in claim 1 including scanning means for scanning the information to be processed and sampling and quantizing it; first memory means connected to said scanning means for storing information of a first scanning line and for reading out one of information of the first scanning line when every one information of the scanning line is read in; OR circuit means connected to the output of said first memory means; discriminator means connected to the output of said OR circuit means for determining whether said output of said OR circuit means comprises a signal in an 0 section or 1 section; mode transition detecting means with input connected to the output of said OR circuit means for comparing the code of the output signal of said OR circuit means and detecting whether a coincidence signal or mode transition is generated; counter and run length coding circuit means for counting the number of pulses when one pulse is transmitted in case of a signal corresponding to the 0 section and for run length coding; second memory means with one input connected to said OR circuit means and a second input connected to the output of said first memory means for storing an information of a picture element at the present scanning position in section 1 of an information of a picture element at the same position as that of the first scanning line in predetermined sequence; said counter means coding the counted run length by the run length code and transmitting the result to said OR circuit means when a mode transition is detected; said second memory circuit means storing two picture element informations of the first and second scanning lines; said second memory means transmits the stored information in section 1 of the OR signal and transmits an end signal simultaneously when a mode transition is generated from the section 0 of the OR signal to the section 1; and buffer memory means connected to the output of said OR circuit means for transmitting information to a transmission line at a predetermined transmission speed.

5. A system as claimed in claim 1, wherein said coding circuit means comprises means for run length-coding one of said sections, and means for converting the other section into a series of raw signals by arranging sequentially the bit signals in the same position as in the original signals and into an end signal positioned at the end of the raw signal train for signalling the termination of the raw signal train.

6. A system as claimed in claim 5, wherein said end signal for indicating the boundary of the raw signal train and series of run length codes consists of binary signals, the number of which is made the same as that of said scanning lines.

* * * * *